United States Patent
Viswanathan et al.

(10) Patent No.: US 12,437,474 B2
(45) Date of Patent: Oct. 7, 2025

(54) SYSTEM AND METHOD FOR GENERATING AND SECURING A USER-SPECIFIC APPLICATION IN AN EXTENDED REALITY ENVIRONMENT

(71) Applicant: Bank of America Corporation, Charlotte, NC (US)

(72) Inventors: Krithika Viswanathan, Chennai (IN); Shailendra Singh, Thane West (IN); Suresh K. S., Chennai (IN); Amit Mishra, Chennai (IN); Subburathinam Krishnan, Chennai (IN)

(73) Assignee: Bank of America Corporation, Charlotte, NC (US)

( * ) Notice: Subject to any disclaimer, the term of this patent is extended or adjusted under 35 U.S.C. 154(b) by 118 days.

(21) Appl. No.: 18/474,847

(22) Filed: Sep. 26, 2023

(65) Prior Publication Data
US 2025/0104342 A1 Mar. 27, 2025

(51) Int. Cl.
*G06T 17/00* (2006.01)
*G06F 3/01* (2006.01)

(52) U.S. Cl.
CPC .............. *G06T 17/00* (2013.01); *G06F 3/012* (2013.01); *G06F 3/013* (2013.01); *G06F 3/014* (2013.01)

(58) Field of Classification Search
CPC ......... G06T 17/00; G06F 3/012; G06F 3/013; G06F 3/014
USPC ........................................................ 345/419
See application file for complete search history.

(56) References Cited

U.S. PATENT DOCUMENTS

| | | |
|---|---|---|
| 11,316,690 B2 | 4/2022 | Madisetti et al. |
| 11,522,690 B2 | 12/2022 | Detres et al. |
| 2019/0251748 A1* | 8/2019 | VanBlon .................. G06T 19/20 |
| 2020/0219094 A1 | 7/2020 | Dikhit et al. |
| 2021/0201336 A1 | 7/2021 | Mallett et al. |
| 2021/0398095 A1 | 12/2021 | Mallett et al. |
| 2022/0166626 A1 | 5/2022 | Madisetti et al. |
| 2022/0214743 A1* | 7/2022 | Dascola .................. G06F 3/017 |
| 2022/0262080 A1* | 8/2022 | Burton .................. G06V 40/168 |
| 2022/0274703 A1 | 9/2022 | Di Cosola |
| 2022/0343768 A1 | 10/2022 | Di Cosola |
| 2022/0353082 A1 | 11/2022 | Busch |
| 2023/0038412 A1 | 2/2023 | Howell et al. |
| 2023/0095505 A1 | 3/2023 | DiCosola |
| 2023/0102054 A1* | 3/2023 | Fasogbon ............ H04N 19/597 345/473 |

(Continued)

*Primary Examiner* — David T Welch

(57) ABSTRACT

A method includes rendering, on displays of an extended reality (XR) device, an XR environment, and detecting, based on sensor data obtained from sensors of the XR device, a device capability associated with the XR device and one or more environmental conditions associated with the XR environment. The method further includes receiving a request corresponding to one or more user interactions with an XR application. In response to receiving the request, the method includes generating, based the device capability and the environmental conditions, a dynamic digital profile to be associated with the user, in which the dynamic digital profile is dynamically generated to be responsive to one or more input modalities associated with the request, and render, on the displays, the dynamic digital profile. The rendered dynamic digital profile includes a set of elements responsive to the one or more input modalities of the request.

20 Claims, 4 Drawing Sheets

(56) References Cited

U.S. PATENT DOCUMENTS

| | | |
|---|---|---|
| 2023/0134118 A1 | 5/2023 | Sehremelis |
| 2023/0185996 A1 | 6/2023 | Jenrola et al. |
| 2023/0186281 A1 | 6/2023 | Todasco |
| 2023/0196206 A1 | 6/2023 | McDonald et al. |
| 2023/0196352 A1 | 6/2023 | Patterson |
| 2023/0259981 A1 | 8/2023 | Venezia |
| 2023/0267128 A1 | 8/2023 | Nicolas et al. |
| 2023/0275751 A1 | 8/2023 | Sneider |
| 2023/0281604 A1 | 9/2023 | Robell et al. |
| 2023/0367833 A1* | 11/2023 | Kol ................. G06F 16/958 |
| 2024/0152245 A1* | 5/2024 | Broughton .......... G06F 3/013 |
| 2024/0161412 A1* | 5/2024 | Jia ................... G06F 3/011 |
| 2025/0022237 A1* | 1/2025 | Burton ............. G06T 19/006 |
| 2025/0104341 A1* | 3/2025 | Yarabolu ........... G06F 3/014 |

* cited by examiner

SYSTEM AND METHOD FOR GENERATING AND SECURING A USER-SPECIFIC APPLICATION IN AN EXTENDED REALITY ENVIRONMENT

TECHNICAL FIELD

The present disclosure relates generally to extended reality environments, and, more specifically, to a system and method for generating and securing a user-specific application in an extended reality environment.

BACKGROUND

Some institutions may provide applications suitable for extended reality (XR) environments (e.g., virtual-reality (VR) environments, augmented-reality (AR) environments, mixed-reality (MR) environments, and so forth), which may allow users to perform interactions in XR. As the number of users and associated user avatars interacting with such applications increases, users may desire to perform sensitive user interactions and exchange sensitive data within XR environments. However, securing applications executing within the XR environment and the user interactions therewith may be challenging.

SUMMARY

The system and methods implemented by the system as disclosed in the present disclosure provide technical solutions to the technical problems discussed above by providing systems and methods for generating and securing a user-specific application (e.g., dynamic digital profile) in an extended reality (XR) environment. The disclosed system and methods provide several practical applications and technical advantages.

The present embodiments are directed to systems and methods for generating and securing a user-specific application (e.g., dynamic digital profile) in an extended reality (XR) environment. In particular embodiments, one or more processors of a computing system may render, on one or more displays of an XR device, an XR environment. For example, in one embodiment, the XR environment may be configured to facilitate user interactions with the plurality of XR applications while executing within the XR environment. In particular embodiments, the one or more processors may then detect, based on sensor data obtained from one or more sensors of the XR device, a device capability associated with the XR device and one or more environmental conditions associated with the XR environment.

For example, in some embodiments, the device capability may include one or more of a set of device capabilities including an eye-tracking capability, a face-tracking capability, a haptic feedback capability, a head pose tracking capability, a hand tracking capability, a full-body tracking capability, a voice control capability, or a biometric input capability. In particular embodiments, the one or more environmental conditions may include one or more of a set of environmental conditions including one or more conditions associated with the at least one XR application, one or more conditions associated with a plurality of user avatars configured to interact with one or more of the plurality of XR applications, or one or more security conditions associated with the request.

In particular embodiments, the one or more processors may then receive a request corresponding to one or more user interactions with at least one XR application of the plurality of XR applications. In particular embodiments, in response to receiving the request corresponding to one or more user interactions, the one or more processors may then generate, based at least in part upon the device capability and the one or more environmental conditions, a dynamic digital profile to be associated with the user. For example, in one embodiment, the dynamic digital profile may be dynamically generated to be responsive to one or more input modalities associated with the request. In particular embodiments, in further response to receiving the request corresponding to one or more user interactions, the one or more processors may then render, on the one or more displays of the XR device, the dynamic digital profile. In one embodiment, the rendered dynamic digital profile may include a set of elements responsive to the one or more input modalities of the request.

In particular embodiments, the dynamic digital profile may include a Web3 profile configured to be generated and executed within the XR environment at runtime. In particular embodiments, the one or more processors may identify the one or more input modalities associated with the request, generate the dynamic digital profile by matching the identified one or more input modalities to at least a subset of the set of device capabilities, and render, on the one or more displays of the XR device, the dynamic digital profile in accordance with the identified one or more input modalities and the subset of the set of device capabilities. In particular embodiments, the one or more processors may identify the one or more security conditions associated with the request, generate the dynamic digital profile by matching the identified one or more security conditions to at least a subset of the set of environmental conditions, and render, on the one or more displays of the XR device, the dynamic digital profile in accordance with the identified one or more security conditions and the subset set of the environmental conditions.

In particular embodiments, the one or more processors may identify a user intent associated with the request. In particular embodiments, the one or more processors may then input, into an intelligent decisioning engine, the device capability, the one or more environmental conditions, and the identified user intent. In particular embodiments, the one or more processors may then generate, by the intelligent decisioning engine and a dynamic digital profile rendering engine, and based at least in part upon the device capability, the one or more environmental conditions, and the identified user intent, the dynamic digital profile to be associated with the user. In one embodiment, the one or more processors may generate, by the intelligent decisioning engine and the dynamic digital profile rendering engine, the dynamic digital profile by executing a source code for the dynamic digital profile at runtime.

In particular embodiments, the one or more processors may generate, by the intelligent decisioning engine and the dynamic digital profile rendering engine, and based at least in part upon the device capability, the one or more environmental conditions, and the identified user intent, a container. For example, in one embodiment, the container may include a placeholder for the dynamic digital profile. In particular embodiments, the one or more processors may then access, by a module bundler, the source code for the dynamic digital profile and one or more libraries stored on the module bundler. In particular embodiments, the one or more processors may then build, by the module bundler, and utilizing the source code for the dynamic digital profile and the one or more libraries, the dynamic digital profile. In particular embodiments, the one or more processors may then render, on the one or more displays of the XR device, the dynamic digital profile in place of the container.

In particular embodiments, subsequent to rendering the dynamic digital profile, the one or more processors may then authenticate the dynamic digital profile for use in satisfying the request based at least in part upon one or more private keys associated with the dynamic digital profile. For example, in particular embodiments, the one or more processors may authenticate the dynamic digital profile for use in satisfying the request by exchanging the one or more private keys between a quantum key distribution (QKD) server and the at least one XR application.

The disclosed system and method provide the additional practical application of improving interoperability and security of extended reality (XR) systems (e.g., virtual reality (VR) systems, augmented reality (AR) systems, mixed (MR) systems, and so forth) executing Web3 applications by way of providing systems and methods for generating and securing a user-specific application (e.g., dynamic digital profile) in an extended reality environment. For example, Web3 applications may generally include decentralized applications (dApps), which may be implemented and executed utilizing blockchain technology.

In some instances, Web3 applications may be implemented and executed within XR environments (e.g., VR environments, AR environments, MR environments, and so forth), which may allow users to perform meaningful interactions with Web3 applications in XR. Indeed, layering Web3 applications on top of XR environments may enrich user interactions and user experiences in XR with respect to performing, for example, both recreational and work-related Web3 tasks. Additionally, by dynamically generating and rendering dynamic digital profiles (e.g., dynamic Web3 user-specific profile) in real-time or near real-time that is both dynamically responsive to user input modality and generated utilizing self-destructing source code, sensitive information may be seamlessly and securely shared between XR environments and XR and Web3 applications executing within the XR environments without the possibility of sensitive data being stolen or otherwise accessible to unauthorized users.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

Example System

Figure 1:
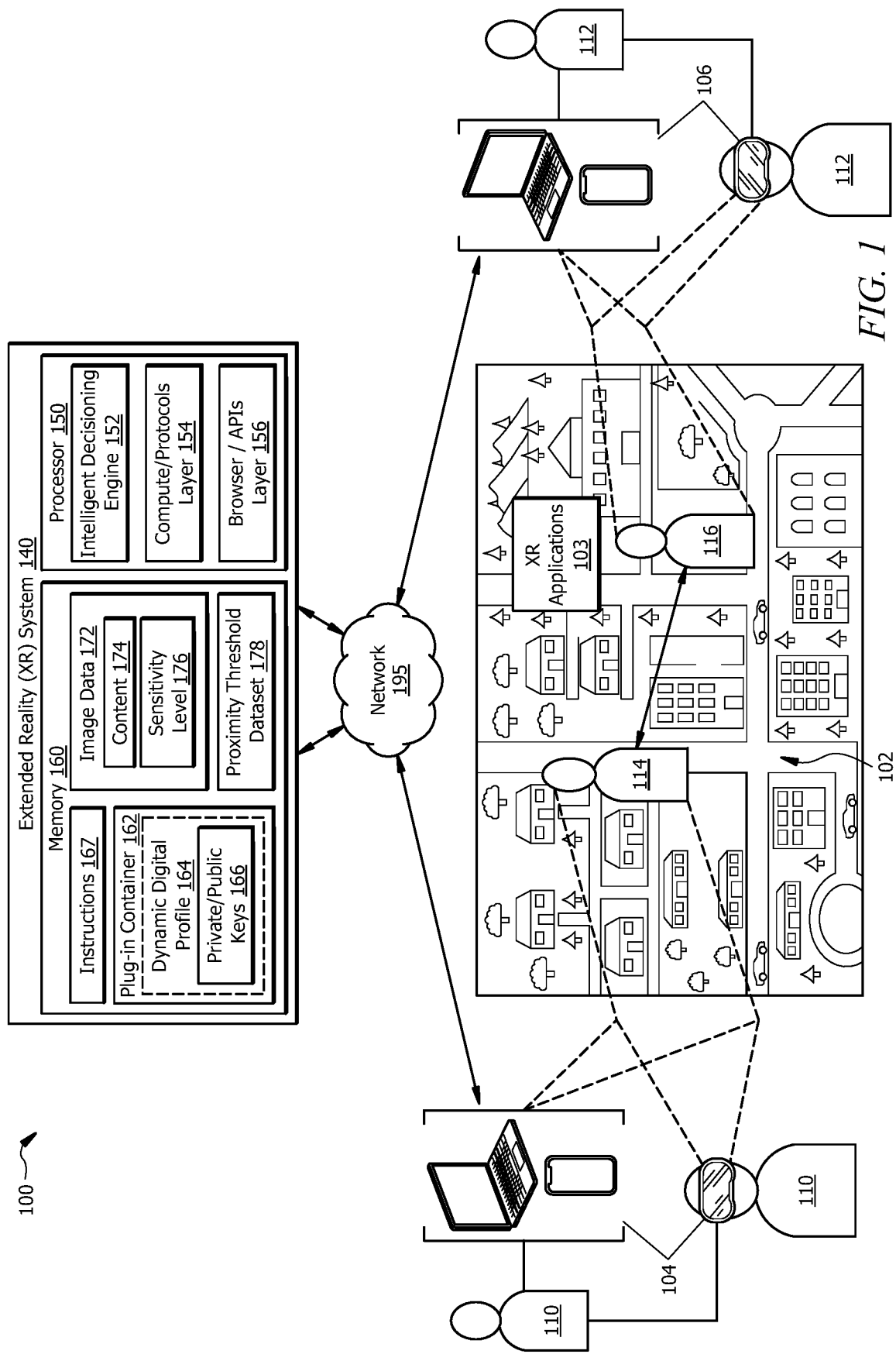
FIG. 1 is a block diagram of a system of an extended reality (XR) system and network, in accordance with certain aspects of the present disclosure.

FIG. 1 is a block diagram of an extended reality (XR) system and network 100, in accordance with certain aspects of the present disclosure. In particular embodiments, the system and network 100 may include a first XR device 104, a second XR device 106, real-world server 130, and a XR system 140, each connected to a network 195. A first user 110 is associated with the first XR device 104 and a second user 112 is associated with the second XR device 106. The system and network 100 may be communicatively coupled to the network 195 and may be operable to transmit data between each one of the first XR device 104, the second XR device 106, and the XR system 140 through the network 195.

In particular embodiments, the system and network 100 may improve interoperability and security of extended reality (XR) systems (e.g., virtual reality (VR) systems, augmented reality (AR) systems, mixed (MR) systems, and so forth) so that information may be seamlessly and securely shared between these systems to implement data security, authorization and authentication of data interactions, access to an extended reality environment 102 (e.g., metaverse environment, VR environment, AR environment, MR environment, or some combination thereof), access to entities within the extended reality environment 102 and other data interactions performed in real-world and extended reality environments. For example, user information or sensor data retrieved from a user and/or a user's XR device in a real-world environment may be used in the extended reality environment 102 to determine whether to restrict or allow access to a particular XR application 103 or one or more particular rendered objects associated with the particular XR application 103 within the extended reality environment 102 and/or to perform any kind of action or interaction with the particular XR application 103 or the one or more particular rendered objects associated with the particular XR application 103.

Additionally, or alternatively, user information collected from the first user 110 and/or assigned to the first user 110 in the real-world environment or extended reality environment 102 may be used in the extended reality environment 102 to provide the first user 110 access to products, services and/or experiences within the extended reality environment 102. This process provides improved information security because it authenticates that a first avatar 114 is associated with the first user 110, not an unauthorized party, and that the first user 110 is authorized to access the extended reality environment 102, obtain products, services and experiences within the extended reality environment 102 and perform data interactions. Further, a user may obtain a product, service or experience by transferring real-world data objects between real-world entities based on data interactions performed in the extended reality environment 102.

In particular embodiments, the first user 110 may access the extended reality environment 102 through the first XR device 104. The first XR device 104 is configured to display a two-dimensional (2D) or three-dimensional (3D) representation of the extended reality environment 102 to the first user 110. Examples of an extended reality environment 102 may include, but are not limited to, a graphical or virtual representation of a metaverse, a map, a building interior, a landscape, a fictional location, an alternate reality, or any other suitable type of location or environment. The extended reality environment 102 may be configured to use realistic or non-realistic physics for the motion of objects and allow the avatars 114, 116 to interact with one or more XR applications 103 within the extended reality environment 102. For example, some extended reality environments 102 may be configured to use gravity whereas other extended reality environments 102 may not be configured to use gravity. Within the extended reality environment 102, each user may be associated with an avatar (such as the first avatar 114 for the first user 110). An avatar is a graphical representation of a user at a virtual location within the extended reality environment 102.

In particular embodiments, the virtual location of each avatar 114, 116 may be correlated to the physical location of each respective user 110, 112 in the real-world environment. Examples of avatars 114, 116 may include, but are not limited to, a person, an animal, or an object. In some embodiments, the features and characteristics of the avatars 114, 116 may be customizable, and user defined. For example, the size, shape, color, attire, accessories, or any other suitable type of appearance features may be specified by a user. By using the avatars 114, 116, the respective users 110, 112 may be able to move within the extended reality environment 102 to interact with one or more avatars and objects within the extended reality environment 102 while independently remaining at a physical location in the real-world environment or being in transit in the real-world environment.

While engaging in the extended reality environment 102 via the first avatar 114, the first user 110 may interact with a number of other users, objects and/or entities through a respective avatar. For example, the second user 112 may attempt to engage in an interaction session with the first avatar 114 through a second avatar 116 associated with the second user 112. In another example, the first avatar 114 of the first user 110 may access an extended reality sub-environment (not shown) within the extended reality environment 102 and perform virtual data interactions within the virtual sub-environment. In the real-world environment, the second user 112 may be physically located at a distance away from the first user 110. The second user 112 may access the extended reality environment 102 through the second XR device 106 to control the second avatar 116 and attempt to engage in an interaction session with the first user 110 through the first avatar 114.

Before the interaction between the first avatar 114 and the second avatar 116 occurs, the XR system 140 may authenticate that the first avatar 114 is associated with the first user 110 and not an unauthorized third-party. For example, the first user 110 may be required to sign into a secure portal that provides access to a data file associated with the first user 110. In some examples, a real-world data file of the first user 110 and a first virtual data file of the first user 110 may be stored and managed by the XR system 140. Similarly, a second virtual data file associated with the second user 112 is managed by the XR system 140.

In particular embodiments, the XR system 140 may store other information related to the first user 110 including, but not limited to, users' profile, account information (e.g., including identity and other details relating to users 110, 112), avatar information, digital assets information, or any other suitable type of information that is associated with a user within the extended reality environment 102 and/or the real-world environment. As depicted in FIG. 1, the XR system 140 may include a processor 150 and a memory 160. The processor 150 may include one or more processors operably coupled to the memory 160. In some embodiments, the processor 150 may be any electronic circuitry including, but not limited to, state machines, one or more central processing unit (CPU) chips, logic units, cores (e.g., a multi-core processor), field-programmable gate array (FPGAs), application specific integrated circuits (ASICs), or digital signal processors (DSPs). In other embodiments, the processor 150 may be a programmable logic device, a microcontroller, a microprocessor, or any suitable combination of the preceding.

In particular embodiments, the processor 150 is communicatively coupled to and in signal communication with the memory 160. The processor 150 may be configured to process data and may be implemented in hardware or software. For example, the processor 150 may be 8-bit, 16-bit, 32-bit, 64-bit or of any other suitable architecture. The processor 150 may include an arithmetic logic unit (ALU) for performing arithmetic and logic operations, processor registers that supply operands to the ALU and store the results of ALU operations, and a control unit that fetches instructions 167 from memory 160 and executes them by directing the coordinated operations of the ALU, registers and other components.

In particular embodiments, the processor 150 may be configured to implement various instructions 167. For example, the processor 150 may be configured to execute the instructions 167 to implement the XR system 140. In this way, processor 150 may be a special-purpose computer designed to implement the functions disclosed herein. In particular embodiments, the XR system 140 is implemented using logic units, FPGAs, ASICs, DSPs, or any other suitable hardware. The XR system 140 is configured to operate as described below with reference to FIGS. 2 and 4, for example. For example, the processor 150 may be configured to perform at least a portion of the method 400 as described in FIG. 4. In particular embodiments, as will be discussed in greater detail below, the processor 150 may include an intelligent decisioning engine 152, a compute/protocols layer 154, and a browser/API layer 156.

In particular embodiments, the memory 160 may include one or more disks, tape drives, or solid-state drives, and may be used as an over-flow data storage device, to store programs when such programs are selected for execution, and to store instructions 167 and data that are read during program execution. The memory 160 may be volatile or non-volatile and may comprise a read-only memory (ROM), random-access memory (RAM), ternary content-addressable memory (TCAM), dynamic random-access memory (DRAM), and static random-access memory (SRAM). In particular embodiments, the memory 160 is operable to store a container 162, a dynamic digital profile 164, an authority level, image data 172, content 174, a sensitivity level 176, and a proximity threshold dataset 178. In particular embodiments, the image data 172 may include any pixel data or voxel data that may be utilized to render and display the extended reality environment 102 (including XR application 103 and avatars 114, 116) onto respective displays of the XR devices 104 and 106 of the first user 110 and the second user 112, respectively.

In particular embodiments, network 195 may include all or a portion of a local area network (LAN), a wide area network (WAN), an overlay network, a software-defined network (SDN), a virtual private network (VPN), a packet data network (e.g., the Internet), a mobile telephone network (e.g., cellular networks, such as 4G or 5G), a Plain Old Telephone (POT) network, a wireless data network (e.g., WiFi, WI Gig, WiMax, etc.), a Long Term Evolution (LTE) network, a Universal Mobile Telecommunications System (UMTS) network, a peer-to-peer (P2P) network, a Bluetooth network, a Near Field Communication network, a Zigbee network, and/or any other suitable network, operable to facilitate communication between the components of system and network 100. In other embodiments, system and network 100 may not have all of these components and/or may have other elements instead of, or in addition to, those above.

While the present embodiments may be discussed herein primarily with respect to XR devices 104, 106 being suitable for rendering and displaying the extended reality environment 102 (including XR application 103 and avatars 114, 116), it should be appreciated that the XR devices 104, 106 may be any user computing devices configured to communicate with other devices, such as a server (e.g., XR system 140), databases, etc. through the network 195. Each of the user devices may be configured to perform specific functions described herein and interact with the XR system 140, e.g., via respective user interfaces. Each of the XR devices 104, 106 is a hardware device that is generally configured to provide hardware and software resources to the first user 110 and the second user 112, respectively.

Examples of the XR devices 104, 106 include, but are not limited to, a VR device, an AR device, an MR device, a laptop, a computer, a smartphone, a tablet, a smart device, an Internet-of-Things (IoT) device, or some combination thereof. In particular embodiments, the XR devices 104, 106 may each include one or more displays, a touchscreen, a touchpad, keys, buttons, a mouse, or any other suitable type of hardware that allows the respective users 110, 112 to view data and/or to provide inputs into the XR devices 104, 106. In particular embodiments, the XR devices 104, 106 may also each include any number of sensors suitable for detecting and tracking sensor data (e.g., telemetry data) associated with one or more of the XR devices 104, 106, the users 110, 112, the avatars 114, 116, and/or the one or more XR applications 103.

For example, in particular embodiments, the number of sensors may include one or more of inertial measurement units (IMUs), one or more monochromatic cameras, one or more visible-light cameras (VLCs), one or more infrared (IR) cameras, one or more depth cameras, one or more accelerometers, one or more magnetometers, one or more gyroscopes, or other sensors that may be suitable for detecting and tracking a head pose of the respective users 110, 112, an eye gaze of the respective users 110, 112, a hand gesture of the respective users 110, 112, a face of the respective users 110, 112, a body movement of the respective users 110, 112, a haptic control of the respective users 110, 112, a spatial proximity of the avatars 114, 116 with respect to one or more rendered objects associated with the XR application 103, an object pose of one or more rendered objects associated with the XR application 103.

In particular embodiments, as previously noted, the processor 150 may include the intelligent decisioning engine 152. In particular embodiments, the intelligent decision engine 202 may include, for example, any computing engine or accelerator (e.g., software, hardware, or some combination of software and hardware) suitable for receiving inputs of a user intent, one or more device capabilities associated with the XR device 104, and one or more environmental conditions associated with the XR application 103 and generating and providing a decision output based thereon. In particular embodiments, the compute/protocols layer 154 may include any distributed software layer or distributed software system suitable for servicing and hosting a number of zero-trust or low-trust user interaction protocols (e.g., zero-trust and low-trust data distribution protocols, zero-trust and low-trust transient data messaging protocols, and so forth). In particular embodiments, the browser/API layer 156 may include any distributed software layer or distributed software system suitable for servicing and hosting one or more protocol extensible developer application programming interfaces (APIs) (e.g., Web3.js, ether.js, Solidity, Rust, and so forth) and one or more protocol extensible user interface cradles or other user-facing protocol extensible applications.

In particular embodiments, as will be further appreciated with respect to FIG. 2 below, the memory 160 may store a dynamic digital profile 164 (e.g., dynamic Web3 profile) that may be generated and rendered in real-time or near real-time (e.g., extemporaneously or "on-the-fly") and utilized to complete and finalize sensitive user interactions with the XR application 103. For example, as will be described in greater detail below, a container 162 (e.g., smart plugin container) may be generated and stored as a placeholder for one or more of a number of dynamic digital profiles 164 (e.g., dynamic Web3 profile), which may be selected based one or more dynamic digital profile decision outputs generated by the intelligent decisioning engine 152.

In particular embodiments, the memory 160 may also store or temporarily access one or more sets of public keys and/or private keys 166, which may be each associated with the dynamic digital profile 164 (e.g., dynamic Web3 profile) and utilized to authenticate the dynamic digital profile 164 (e.g., dynamic Web3 profile) as discussed below with respect to FIG. 3. For example, in one embodiment, the dynamic digital profile 164 (e.g., dynamic Web3 profile) may include a wrapper that contains one or more sets of public keys and/or private keys 166 associated with the user 110, in which the one or more sets of public keys and/or private keys 166 may be utilized to sign, authenticate, and execute sensitive user interactions with, for example, the XR application 103.

Generating and Securing a User-Specific Application in an XR Environment

Embodiments of the present disclosure discuss techniques system for generating and securing a user-specific application within an extended reality (XR) environment.

Figure 2:
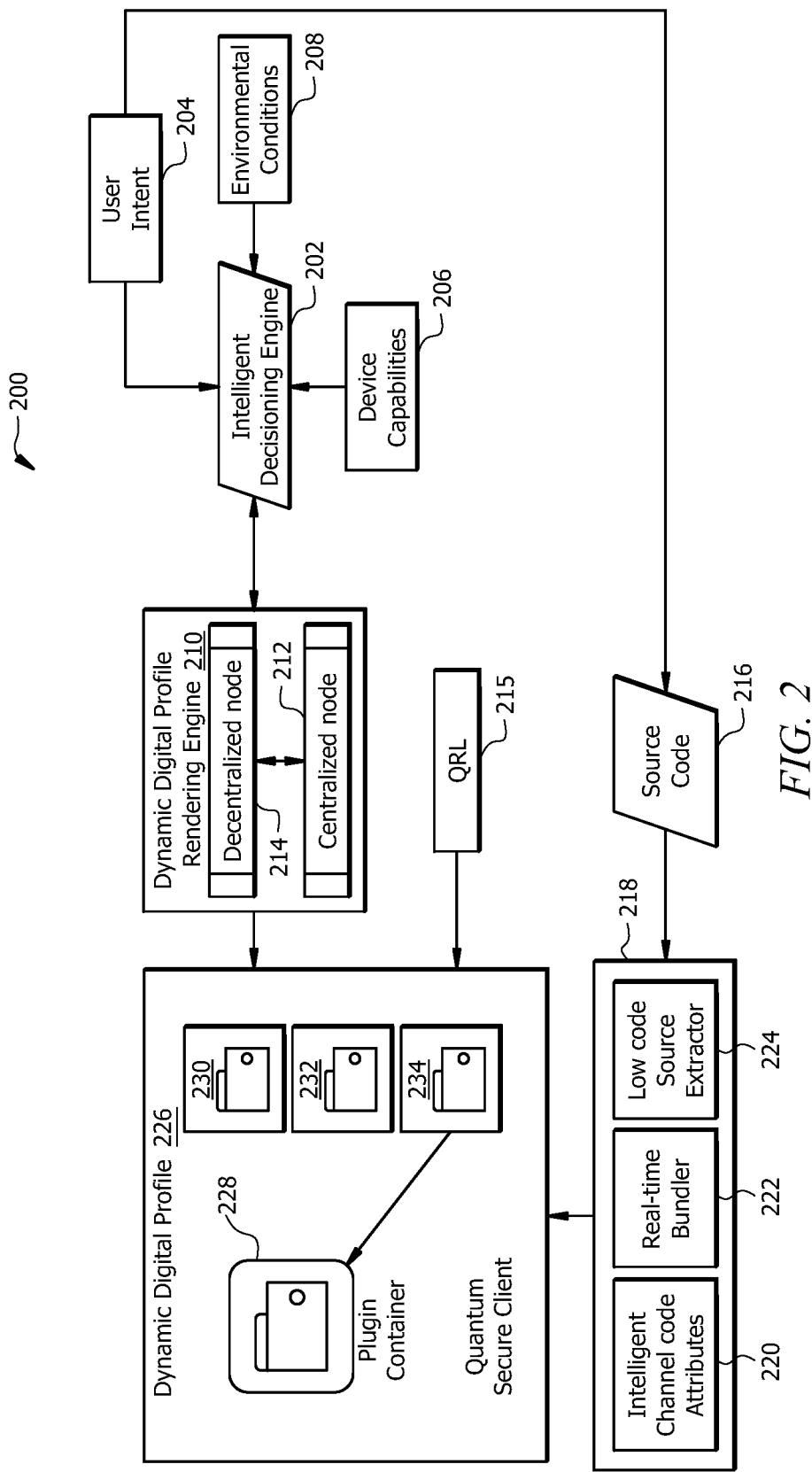
FIG. 2 is a block diagram of an embodiment of an extended reality (XR) and Web3 environment for generating and securing dynamic digital profiles in the XR environment, in accordance with certain aspects of the present disclosure.

FIG. 2 is a block diagram of an embodiment of an extended reality (XR) and Web3 environment 200 for generating and securing dynamic digital profiles (e.g., dynamic Web3 profiles) in the XR environment, in accordance with certain aspects of the present disclosure. As depicted, in particular embodiments, the XR and Web3 environment 200 may include an intelligent decision engine 202. In particular embodiments, the intelligent decision engine 202 may include, for example, any computing engine or accelerator suitable for receiving inputs of a user intent 204, one or more device capabilities 206 associated with the XR device 104, and one or more environmental conditions 208 associated with the XR application 103 and generating and providing a decision output based thereon.

Specifically, in some embodiments, the intelligent decision engine 202 may determine a user input modality (e.g., eye-gaze input modality, face expression input modality, tactile input modality, a head pose input modality, a hand gesture input modality, a full-body gesture input modality, voice input modality, biometric input modality, and so forth) and complexity associated with the user intent 204 and determine to generate and/or select a dynamic digital profile 226 that is responsive to, and matches with, the user input modality and complexity associated with the user intent 204.

For example, in particular embodiments, the one or more device capabilities 206 may include one or more of a set of device capabilities including an eye-tracking capability, a face-tracking capability, a haptic feedback capability, a head pose tracking capability, a hand tracking capability, a full-body tracking capability, a voice control capability, or a biometric input capability of the XR device 104. Similarly, in particular embodiments, the one or more environmental conditions 208 may include one or more of a set of environmental conditions including one or more conditions associated with the XR application 103, one or more conditions associated with the user avatars 114, 116, or one or more security conditions (e.g., security conditions associated with data-masking sensitive data and user interactions with the XR application 103 whenever an unauthorized user 112 and/or user avatar 116 is detected within a proximity to the user 110 and/or user avatar 114) identified based on the user intent 204.

In particular embodiments, the intelligent decision engine 202 may access a user request corresponding to one or more user interactions by the user 110 with the XR application 103. In particular embodiments, the intelligent decision engine 202 may analyze the user request and identify the user intent 204 associated with the user request. In particular embodiments, upon identifying the user intent 204, the intelligent decisioning engine 202 may then utilize the user intent 204, the one or more device capabilities 206, and the one or more environmental conditions 208 as input and generate and provide a decision output to a dynamic digital profile rendering engine 210 based thereon. For example, in particular embodiments, the dynamic digital profile rendering engine 210 may include, for example, any rendering engine that may be implemented via one or more centralized computing nodes 212 (e.g., one or more centralized servers, such as Web2 servers) or one or more decentralized computing nodes 214 (e.g., one or more distributed nodes as part of a Web3 blockchain architecture).

In particular embodiments, the dynamic digital profile rendering engine 210 may then render the dynamic digital profile 226. For example, in one embodiment, the dynamic digital profile 226 may include a wrapper that contains one or more private keys associated with the user 110, in which the one or more private keys are utilized to sign, authenticate, and execute sensitive user interactions with, for example, the XR application 103. For example, in particular embodiments, the dynamic digital profile rendering engine 210 may first render a container 228 (e.g., smart plugin container), which may be a placeholder for the one of the dynamic digital profiles 230, 232, and 234.

Specifically, in some embodiments, the intelligent decision engine 202 may generate the decision output to instruct the intelligent decision engine 202 to render the dynamic digital profile 226 to be responsive to, and to match with, a user input modality (e.g., eye-gaze input modality, face expression input modality, tactile input modality, a head pose input modality, a hand gesture input modality, a full-body gesture input modality, voice input modality, biometric input modality, and so forth) in accordance with the user intent 204, the one or more device capabilities 206 of the XR device 104, and the one or more environmental conditions 208. The dynamic digital profile rendering engine 210 may then render one or more of the dynamic digital profiles 230, 232, and 234 in accordance with the user input modality and complexity identified from the user intent 204.

In particular embodiments, rendering the dynamic digital profile 226 may then include accessing one or more public or private keys from a quantum resistant ledger (QRL) 215 for user 110 authorization and/or authentication and executing a source code 216 for the dynamic digital profile 226, for example, at runtime. Particularly, in accordance with the presently disclosed embodiments, the dynamic digital profile 226 may be generated and rendered in real-time or near real-time (e.g., extemporaneously or "on-the-fly") to be utilized to complete and finalize sensitive user interactions with the XR application 103. For example, as further depicted by FIG. 2, a module bundler 218 (e.g., including a real-time bundler 222 and a low code source extractor 224) may access the source code 216 for the dynamic digital profile 226 and one or more libraries 220 (e.g., intelligent channel code attributes) stored on the module bundler 218.

In particular embodiments, the module bundler 218 may then build the dynamic digital profile 226 utilizing the source code 216 and the one or more libraries 220 (e.g., intelligent channel code attributes). In particular embodiments, the one or more processors may then render one or more of the dynamic digital profiles 230, 232, and 234 in place of the container 228 (e.g., smart plugin container). In one embodiment, to ensure security of the dynamic digital profile 226 and the one or more private keys associated with the user 110 as contained therein, the source code 216 may include, for example, a self-destructing code that may be destroyed or deleted upon completion of the generation and rendering of the dynamic digital profile 226.

Figure 3:
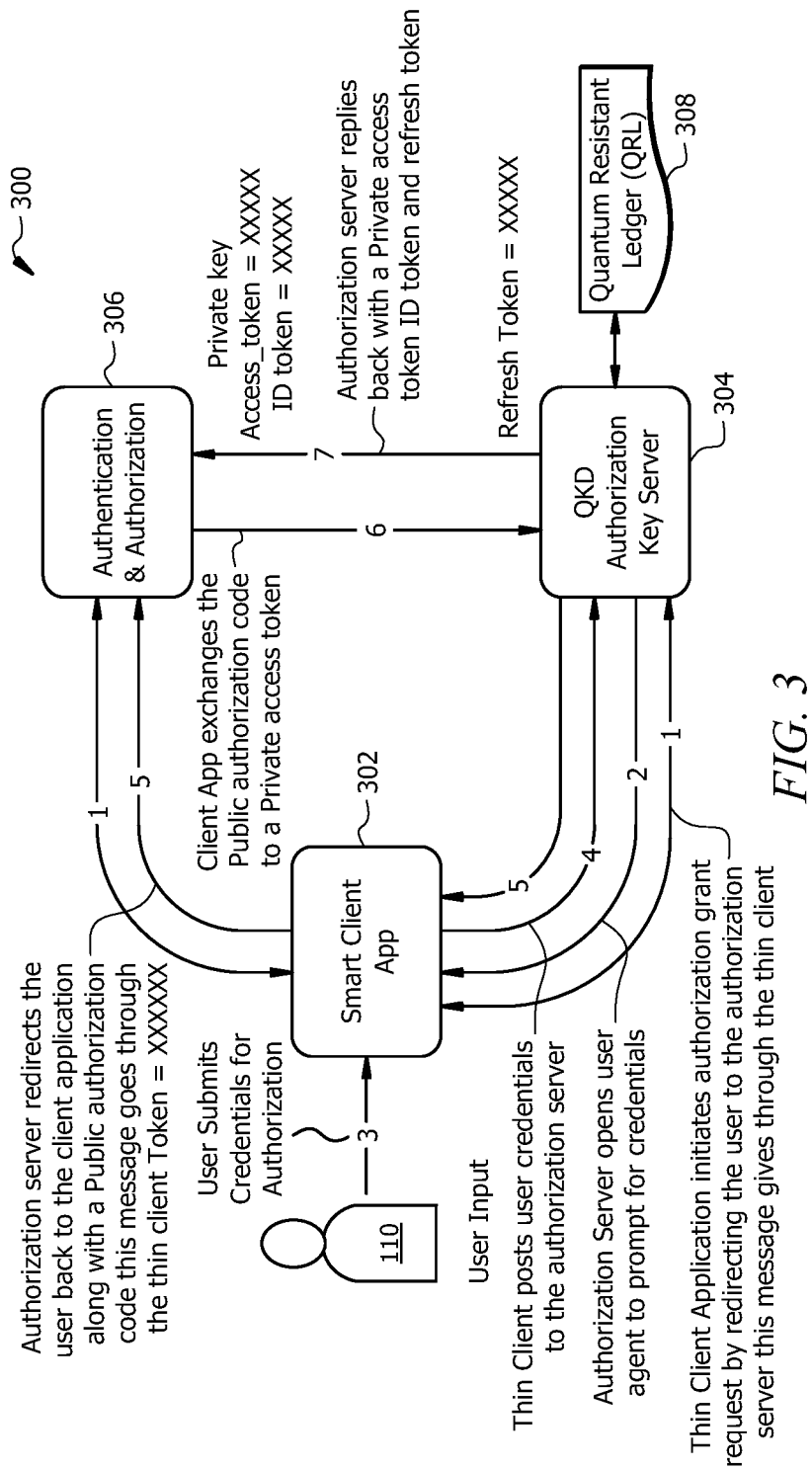
FIG. 3 is a workflow diagram for authenticating a generated dynamic digital profile for use in an extended reality (XR) environment, in accordance with certain aspects of the present disclosure.

FIG. 3 is a workflow diagram 300 for authenticating a generated dynamic digital profile (e.g., dynamic Web3 profile) for use in an extended reality (XR) environment, in accordance with certain aspects of the present disclosure. In particular embodiments, the workflow diagram 300 may be performed subsequent to the generation and rendering of the dynamic digital profile 226 as discussed above with respect to FIG. 2. In particular embodiments, the workflow diagram 300 may begin with the client application 302, which may be executing on the XR device 104, initiating an authorization grant request by redirecting the user 110 to a quantum key distribution (QKD) server 304. In particular embodiments, the QKD server 304 may include secure centralized or decentralized server suitable for managing public keys and/or private keys associated with the user 110, as the private keys are utilized to authenticate and execute sensitive user interactions utilizing the dynamic digital profile 226. The workflow diagram 300 may then continue with the QKD server 304 opening user 110 agent to prompt for credentials. The workflow diagram 300 may then continue with the user 110 submitting credentials via the client application 302 executing on the XR device 104.

In particular embodiments, the workflow diagram 300 may then continue with the client application 302 executing on the XR device 104 providing the credentials of the user 110 to the QKD server 304. In particular embodiments, the workflow diagram 300 may then continue with the QKD server 304 redirecting the user 110 back to the client application 302 along with a public authorization code via authentication and authorization application programming interface (API) 306. In particular embodiments, the workflow diagram 300 may then continue with the client application 302 executing on the XR device 104 exchanging the public authorization code (e.g., public key) to a private key (e.g., private access token) with the QKD server 304. In particular embodiments, workflow diagram 300 may then continue with the QKD server 304 accessing a quantum resistant ledger (QRL) 308 and replying back to the client application 302 executing on the XR device 104 with a private key (e.g., private access token) and a refresh token back. In particular embodiments, the dynamic digital profile 226 may be then authenticated to be utilized to complete and finalize sensitive user interactions with the XR application 103.

Figure 4:
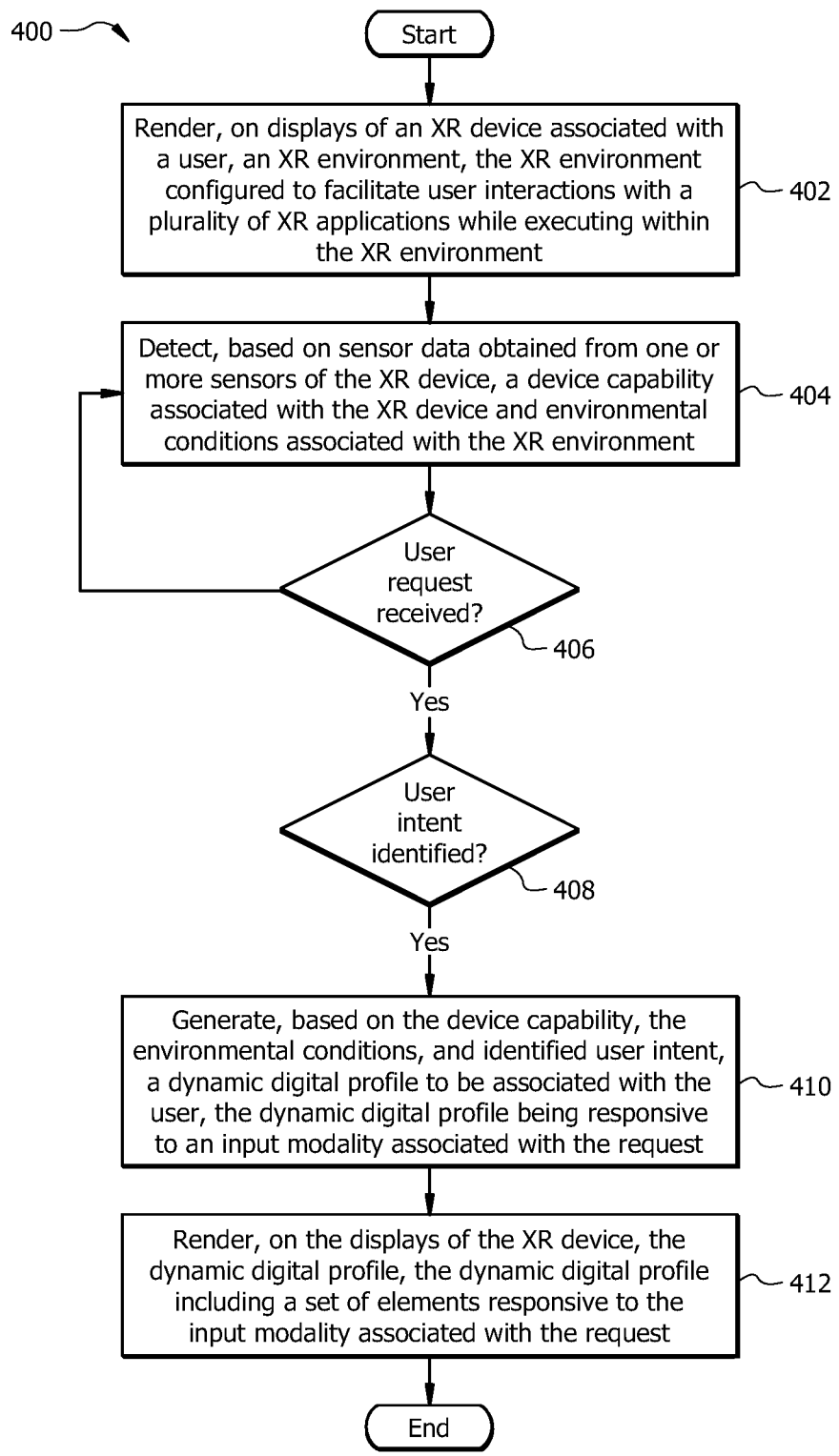
FIG. 4 illustrates a flowchart of an example method for generating and securing dynamic digital profiles in an extended reality (XR) environment, in accordance with one or more embodiments of the present disclosure.

FIG. 4 illustrates a flowchart of an example method 400 for generating and securing dynamic digital profiles (e.g., dynamic Web3 profiles) in an extended reality (XR) environment, in accordance with one or more embodiments of the present disclosure. The method 400 may be performed by the system and network 100 as described above with respect to FIG. 1. The method 400 may begin at block 402 with the XR system 140 rendering on one or more displays of an XR device 104 an extended reality (XR) environment 102. For example, in one embodiment, the XR environment 102 may include any XR environment (e.g., VR environment, AR environment, MR environment, and so forth) suitable for facilitating user interactions with the XR application 103 while executing within the XR environment 102. The method 400 may continue at block 404 with the XR system 140 detecting, based on sensor data obtained from one or more sensors of the XR device 104, one or more device capabilities 206 associated with the XR device 104 and one or more environmental conditions 208 associated with the XR environment 102.

For example, in some embodiments, the one or more device capabilities 206 may include one or more of a set of device capabilities including an eye-tracking capability, a face-tracking capability, a haptic feedback capability, a head pose tracking capability, a hand tracking capability, a full-body tracking capability, a voice control capability, or a biometric input capability. Similarly, in particular embodiments, the one or more environmental conditions 208 may include one or more of a set of environmental conditions including one or more conditions associated with the at least one XR application 103, one or more conditions associated with one or more of user avatars 114, 116, or one or more security conditions determined based on the user intent 204.

In particular embodiments, the method 400 may continue at decision 406 with the XR system 140 determining whether a user request has been received from the XR device 104. For example, in one embodiment, the user request may correspond to one or more user interactions with the XR application 103. In particular embodiments, in response to receiving the user request, the method 400 may continue at decision 408 with the XR system 140 determining whether the user intent 204 has been identified. In particular embodiments, in response to determining that the user intent 204 has been identified, the method 400 may then continue at block 410 with the XR system 140 generating, based on the one or more device capabilities 206, the one or more environmental conditions 208, and the identified user intent 204, a dynamic digital profile 226.

In some embodiments, the dynamic digital profile 226 may be response to a user input modality (e.g., eye-gaze input modality, face expression input modality, tactile input modality, a head pose input modality, a hand gesture input modality, a full-body gesture input modality, voice input modality, biometric input modality, and so forth) associated with the user request. In particular embodiments, the method 400 may then conclude at block 412 with the XR system 140 rendering, on the one or more displays of the XR device 104, the dynamic digital profile 226, in which the dynamic digital profile 226 includes, for example, a set of elements responsive to, and that matches with, the user input modality (e.g., eye-gaze input modality, face expression input modality, tactile input modality, a head pose input modality, a hand gesture input modality, a full-body gesture input modality, voice input modality, biometric input modality, and so forth) associated with the user request.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

To aid the Patent Office, and any readers of any patent issued on this application in interpreting the claims appended hereto, applicants note that they do not intend any of the appended claims to invoke 35 U.S.C. § 112(f) as it exists on the date of filing hereof unless the words "means for" or "step for" are explicitly used in the particular claim.

The invention claimed is:

1. A system, comprising:
a memory configured to store image data utilized to render an extended reality (XR) environment on an XR device associated with a user and a plurality of XR applications executable within the XR environment; and
one or more processors operably coupled to the memory and configured to:
render, on one or more displays of the XR device, the XR environment, wherein the XR environment is configured to facilitate user interactions with the plurality of XR applications while executing within the XR environment;
detect, based on sensor data obtained from one or more sensors of the XR device, a device capability associated with the XR device and one or more environmental conditions associated with the XR environment; and
receive a request corresponding to one or more user interactions with at least one XR application of the plurality of XR applications, and, in response:
generate, based at least in part upon the device capability and the one or more environmental conditions, a dynamic digital profile to be associated with the user, the dynamic digital profile being dynamically generated to be responsive to one or more input modalities associated with the request; and
render, on the one or more displays of the XR device, the dynamic digital profile, wherein the rendered dynamic digital profile comprises a set of elements responsive to the one or more input modalities of the request.

2. The system of claim 1, wherein the dynamic digital profile comprises a dynamic Web3 profile configured to be generated and executed within the XR environment at runtime.

3. The system of claim 1, wherein the device capability comprises one or more of a set of device capabilities including: an eye-tracking capability; a face-tracking capability; a haptic feedback capability; a head pose tracking capability; a hand tracking capability; a full-body tracking capability; a voice control capability; or a biometric input capability; and wherein the one or more processors are further configured to:
 identify the one or more input modalities associated with the request;
 generate the dynamic digital profile by matching the identified one or more input modalities to at least a subset of the set of device capabilities; and
 render, on the one or more displays of the XR device, the dynamic digital profile in accordance with the identified one or more input modalities and the subset of the set of device capabilities.

4. The system of claim 1, wherein the one or more environmental conditions comprises one or more of a set of environmental conditions including: one or more conditions associated with the at least one XR application; one or more conditions associated with a plurality of user avatars configured to interact with one or more of the plurality of XR applications; or one or more security conditions associated with the request; and wherein the one or more processors are further configured to:
 identify the one or more security conditions associated with the request;
 generate the dynamic digital profile by matching the identified one or more security conditions to at least a subset of the set of environmental conditions; and
 render, on the one or more displays of the XR device, the dynamic digital profile in accordance with the identified one or more security conditions and the subset set of the environmental conditions.

5. The system of claim 1, wherein the one or more processors are further configured to:
 identify a user intent associated with the request;
 input, into an intelligent decisioning engine, the device capability, the one or more environmental conditions, and the identified user intent; and
 generate, by the intelligent decisioning engine and a rendering engine, and based at least in part upon the device capability, the one or more environmental conditions, and the identified user intent, the dynamic digital profile to be associated with the user, wherein generating, by the intelligent decisioning engine and the rendering engine, the dynamic digital profile comprises executing a source code for the dynamic digital profile at runtime.

6. The system of claim 5, wherein the one or more processors are further configured to:
 generate, by the intelligent decisioning engine and the rendering engine, and based at least in part upon the device capability, the one or more environmental conditions, and the identified user intent, a container, wherein the container comprises a placeholder for the dynamic digital profile;
 access, by a module bundler, the source code for the dynamic digital profile and one or more libraries stored on the module bundler;
 build, by the module bundler, and utilizing the source code for the dynamic digital profile and the one or more libraries, the dynamic digital profile; and
 render, on the one or more displays of the XR device, the dynamic digital profile in place of the container.

7. The system of claim 6, wherein the one or more processors are further configured to:
 subsequent to rendering the dynamic digital profile, authenticate the dynamic digital profile for use in satisfying the request based at least in part upon one or more private keys associated with the dynamic digital profile, wherein authenticating the dynamic digital profile for use in satisfying the request comprises exchanging the one or more private keys between a quantum key distribution (QKD) server and the at least one XR application.

8. A method, comprising:
 rendering, on one or more displays of an extended reality (XR) device associated with a user, an XR environment, wherein the XR environment is configured to facilitate user interactions with a plurality of XR applications while executing within the XR environment;
 detecting, based on sensor data obtained from one or more sensors of the XR device, a device capability associated with the XR device and one or more environmental conditions associated with the XR environment; and
 receiving a request corresponding to one or more user interactions with at least one XR application of the plurality of XR applications, and, in response:
  generating, based at least in part upon the device capability and the one or more environmental conditions, a dynamic digital profile to be associated with the user, the dynamic digital profile being dynamically generated to be responsive to one or more input modalities associated with the request; and
  rendering, on the one or more displays of the XR device, the dynamic digital profile, wherein the rendered dynamic digital profile comprises a set of elements responsive to the one or more input modalities of the request.

9. The method of claim 8, wherein the dynamic digital profile comprises a Web3 profile configured to be generated and executed within the XR environment at runtime.

10. The method of claim 8, wherein the device capability comprises one or more of a set of device capabilities including: an eye-tracking capability; a face-tracking capability; a haptic feedback capability; a head pose tracking capability; a hand tracking capability; a full-body tracking capability; a voice control capability; or a biometric input capability; and wherein the method further comprises:
 identifying the one or more input modalities associated with the request;
 generating the dynamic digital profile by matching the identified one or more input modalities to at least a subset of the set of device capabilities; and
 rendering, on the one or more displays of the XR device, the dynamic digital profile in accordance with the identified one or more input modalities and the subset of the set of device capabilities.

11. The method of claim 8, wherein the one or more environmental conditions comprises one or more of a set of environmental conditions including: one or more conditions associated with the at least one XR application; one or more conditions associated with a plurality of user avatars configured to interact with one or more of the plurality of XR applications; or one or more security conditions associated with the request; and wherein the method further comprises:
identifying the one or more security conditions associated with the request;
generating the dynamic digital profile by matching the identified one or more security conditions to at least a subset of the set of environmental conditions; and
rendering, on the one or more displays of the XR device, the dynamic digital profile in accordance with the identified one or more security conditions and the subset set of the environmental conditions.

12. The method of claim 8, further comprising:
identifying a user intent associated with the request;
inputting, into an intelligent decisioning engine, the device capability, the one or more environmental conditions, and the identified user intent; and
generating, by the intelligent decisioning engine and a rendering engine, and based at least in part upon the device capability, the one or more environmental conditions, and the identified user intent, the dynamic digital profile to be associated with the user, wherein generating, by the intelligent decisioning engine and the rendering engine, the dynamic digital profile comprises executing a source code for the dynamic digital profile at runtime.

13. The method of claim 12, further comprising:
generating, by the intelligent decisioning engine and the rendering engine, and based at least in part upon the device capability, the one or more environmental conditions, and the identified user intent, a container, wherein the container comprises a placeholder for the dynamic digital profile;
accessing, by a module bundler, the source code for the dynamic digital profile and one or more libraries stored on the module bundler;
building, by the module bundler, and utilizing the source code for the dynamic digital profile and the one or more libraries, the dynamic digital profile; and
rendering, on the one or more displays of the XR device, the dynamic digital profile in place of the container.

14. The method of claim 13, further comprising:
subsequent to rendering the dynamic digital profile, authenticate the dynamic digital profile for use in satisfying the request based at least in part upon one or more private keys associated with the dynamic digital profile, wherein authenticating the dynamic digital profile for use in satisfying the request comprises exchanging the one or more private keys between a quantum key distribution (QKD) server and the at least one XR application.

15. A non-transitory computer-readable medium storing instructions that, when executed by one or more processors of a system, cause the one or more processors to:
render, on one or more displays of an extended reality (XR) device associated with a user, an XR environment, wherein the XR environment is configured to facilitate user interactions with a plurality of XR applications while executing within the XR environment;
detect, based on sensor data obtained from one or more sensors of the XR device, a device capability associated with the XR device and one or more environmental conditions associated with the XR environment; and
receive a request corresponding to one or more user interactions with at least one XR application of the plurality of XR applications, and, in response:
generate, based at least in part upon the device capability and the one or more environmental conditions, a dynamic digital profile to be associated with the user, the dynamic digital profile being dynamically generated to be responsive to one or more input modalities associated with the request; and
render, on the one or more displays of the XR device, the dynamic digital profile, wherein the rendered dynamic digital profile comprises a set of elements responsive to the one or more input modalities of the request.

16. The non-transitory computer-readable medium of claim 15, wherein the dynamic digital profile comprises a dynamic Web3 profile configured to be generated and executed within the XR environment at runtime.

17. The non-transitory computer-readable medium of claim 15, wherein the device capability comprises one or more of a set of device capabilities including: an eye-tracking capability; a face-tracking capability; a haptic feedback capability; a head pose tracking capability; a hand tracking capability; a full-body tracking capability; a voice control capability; or a biometric input capability; and wherein the instructions further cause the one or more processors to:
identify the one or more input modalities associated with the request;
generate the dynamic digital profile by matching the identified one or more input modalities to at least a subset of the set of device capabilities; and
render, on the one or more displays of the XR device, the dynamic digital profile in accordance with the identified one or more input modalities and the subset of the set of device capabilities.

18. The non-transitory computer-readable medium of claim 15, wherein the one or more environmental conditions comprises one or more of a set of environmental conditions including: one or more conditions associated with the at least one XR application; one or more conditions associated with a plurality of user avatars configured to interact with one or more of the plurality of XR applications; or one or more security conditions associated with the request; and wherein the instructions further cause the one or more processors to:
identify the one or more security conditions associated with the request;
generate the dynamic digital profile by matching the identified one or more security conditions to at least a subset of the set of environmental conditions; and
render, on the one or more displays of the XR device, the dynamic digital profile in accordance with the identified one or more security conditions and the subset set of the environmental conditions.

19. The non-transitory computer-readable medium of claim 15, wherein the instructions further cause the one or more processors to:
identify a user intent associated with the request;
input, into an intelligent decisioning engine, the device capability, the one or more environmental conditions, and the identified user intent; and
generate, by the intelligent decisioning engine and a rendering engine, and based at least in part upon the device capability, the one or more environmental conditions, and the identified user intent, the dynamic digital profile to be associated with the user, wherein generating, by the intelligent decisioning engine and the rendering engine, the dynamic digital profile comprises executing a source code for the dynamic digital profile at runtime.

20. The non-transitory computer-readable medium of claim 19, wherein the instructions further cause the one or more processors to:
- generate, by the intelligent decisioning engine, and based at least in part upon the device capability, the one or more environmental conditions, and the identified user intent, a container, wherein the container comprises a placeholder for the dynamic digital profile;
- access, by a module bundler, the source code for the dynamic digital profile and one or more libraries stored on the module bundler;
- build, by the module bundler, and utilizing the source code for the dynamic digital profile and the one or more libraries, the dynamic digital profile; and
- render, on the one or more displays of the XR device, the dynamic digital profile in place of the container.

* * * * *